United States Patent
Huber et al.

(10) Patent No.: US 9,762,750 B2
(45) Date of Patent: Sep. 12, 2017

(54) METHOD FOR THE AUTOMATIC PARAMETERIZATION OF THE ERROR DETECTION OF AN IMAGE INSPECTION SYSTEM

(71) Applicant: HEIDELBERGER DRUCKMASCHINEN AG, Heidelberg (DE)

(72) Inventors: Werner Huber, Wiesloch (DE); Thomas Roos, Neulussheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 86 days.

(21) Appl. No.: 14/674,148

(22) Filed: Mar. 31, 2015

(65) Prior Publication Data

US 2015/0281471 A1 Oct. 1, 2015

(30) Foreign Application Priority Data

Mar. 31, 2014 (DE) .................. 10 2014 004 555

(51) Int. Cl.
| | |
|---|---|
| *H04N 1/00* | (2006.01) |
| *G06T 7/00* | (2017.01) |
| *G06T 7/41* | (2017.01) |

(52) U.S. Cl.
CPC ....... *H04N 1/00068* (2013.01); *G06T 7/0004* (2013.01); *G06T 7/0008* (2013.01);
(Continued)

(58) Field of Classification Search
CPC ................. G06T 7/41; G06T 7/0008; G06T 2207/20012; G06T 2207/30144;
(Continued)

(56) References Cited

U.S. PATENT DOCUMENTS 5,724,437 A * 3/1998 Bucher ............... B41F 33/0036
101/183
5,987,094 A * 11/1999 Clarke ................ G01N 23/046
378/62
(Continued)

FOREIGN PATENT DOCUMENTS

DE          19822662 A1    11/1999
DE      102008016538 A1    10/2009

*Primary Examiner* — Stephen R Koziol
*Assistant Examiner* — Pinalben Patel
(74) *Attorney, Agent, or Firm* — Laurence A. Greenberg; Werner H. Stemer; Ralph E. Locher

(57) ABSTRACT

A method automatically parameterizes error detection of an image inspection system by a computer. The method includes digitizing a reference image in order to determine desired values and subdividing the reference image into homogeneous image regions with few edges, and inhomogeneous image regions with strongly structured image areas and many edges. Lower tolerance values for the homogeneous image regions, and higher tolerance values for the inhomogeneous image regions of the digitized reference image are determined by statistical image analyses. The determined tolerances are assigned to their respective desired values in dependence on a position of the desired values in homogeneous or inhomogeneous image regions. An inspection sensitivity is calculated from desired values and their respective tolerances. The parameters of the image inspection system are set with the aid of the inspection sensitivity configuration of the image inspection system using the parameters.

8 Claims, 3 Drawing Sheets

(52) U.S. Cl.
CPC ........... *G06T 7/41* (2017.01); *H04N 1/00015* (2013.01); *H04N 1/00037* (2013.01); *H04N 1/00087* (2013.01); *G06T 2207/10008* (2013.01); *G06T 2207/20004* (2013.01); *G06T 2207/20012* (2013.01); *G06T 2207/30144* (2013.01); *G06T 2207/30168* (2013.01)

(58) Field of Classification Search
CPC . G06T 2207/20004; G06T 2207/10008; G06T 2207/30168; G06T 7/0004; G06T 7/00; H04N 1/00068; H04N 1/00037; H04N 1/00015; H04N 1/00087; H04N 1/00
See application file for complete search history.

(56) References Cited

U.S. PATENT DOCUMENTS

| | | | |
|---|---|---|---|
| 6,230,622 B1 | 5/2001 | Dilling | |
| 6,345,876 B1* | 2/2002 | Tanaka | B41J 29/393 347/19 |
| 6,640,000 B1* | 10/2003 | Fey | C07K 14/47 382/128 |
| 6,654,488 B1* | 11/2003 | Behun | G03F 1/84 382/144 |
| 7,672,022 B1* | 3/2010 | Fan | G06T 5/003 348/207.99 |
| 7,872,651 B2* | 1/2011 | Matskewich | G06K 9/036 345/467 |
| 2001/0016065 A1* | 8/2001 | Yamamoto | G06T 7/11 382/173 |
| 2002/0009220 A1* | 1/2002 | Tanaka | G01N 21/94 382/145 |
| 2003/0068100 A1* | 4/2003 | Covell | G06F 17/30256 382/305 |
| 2003/0152275 A1* | 8/2003 | Chung | G06T 7/001 382/218 |
| 2004/0177783 A1* | 9/2004 | Seymour | B41F 33/0045 101/484 |
| 2006/0126093 A1* | 6/2006 | Fedorovskaya | G06K 9/00255 358/1.14 |
| 2006/0222235 A1* | 10/2006 | Kanegae | G06K 9/00 382/145 |
| 2011/0188089 A1* | 8/2011 | Massen | B41F 33/0036 358/3.24 |
| 2012/0121139 A1* | 5/2012 | Kojima | B41F 33/0036 382/112 |
| 2015/0110400 A1* | 4/2015 | Vilpponen | H04N 5/2257 382/167 |

\* cited by examiner

METHOD FOR THE AUTOMATIC PARAMETERIZATION OF THE ERROR DETECTION OF AN IMAGE INSPECTION SYSTEM

CROSS-REFERENCE TO RELATED APPLICATION

This application claims the priority, under 35 U.S.C. §119, of German application DE 10 2014 004 555.2, filed Mar. 31, 2014; the prior application is herewith incorporated by reference in its entirety.

BACKGROUND OF THE INVENTION

Field of the Invention:

The present invention relates to a method for the automatic parameterization of error detection of an image inspection system.

The invention is in the technical field of test automation.

The image inspection method to be parameterized has been used to date to check the finished printed products for possible errors in the course of carrying out a printing job. In this case, the printed images are scanned by a digital camera, sent to a server and compared there with a reference image produced from prepress data. Depending on parameterization of the comparing algorithms, deviations between the redigitized printed image and the reference image are detected as errors and displayed in this case.

According to the prior art, there are a plurality of options for the parameterization. The most common option is the manual setting of the parameters by the user. In this case, the user analyzes the reference image prepared from the prepress data of the printing job, and configures the image inspection method with the aid of the result of analysis and his personal experience. Known extensions of the procedure are, for example, the abstraction of the setting parameters into various sensitivity levels. The advantage of the procedure is that even inexperienced users can undertake a parameterization of the inspection method, since the user no longer has direct access to the individual parameters. It is, by contrast, disadvantageous that there is a lack of flexibility by comparison with the completely free manual setting. A common disadvantage of all known manual methods is, in addition, the dependence on a human user whose analysis, and therefore the setting of the image inspection method can be defective. The error quota is higher the more inexperienced the user, and more complex the selection of setting parameters. In addition, for reasons of time, and thus of cost, an adjustment of the parameters is generally not performed for each new printing job.

SUMMARY OF THE INVENTION

The object of the present invention is therefore to disclose a method for the automated parameterization of the image inspection method in which the test parameters are selected and quantified on the basis of the image contents of the image to be tested.

The object is achieved according to the invention by a method having the features of the main method claim. More specifically, a method for the automated parameterization of error detection of an image inspection system is performed by a computer. The method includes the now described steps.

1. The digitization of the reference image in order to determine the desired values.
2. The subdivision of the reference image into homogeneous image regions with few edges, and inhomogeneous image regions with strongly structured image areas and many edges.
3. The determination of low tolerance values for the homogeneous image regions, and of higher tolerance values for the inhomogeneous image regions of the digitized reference image by statistical image analyses.
4. Assignment of the determined tolerances to their respective desired values as a function of the position of the desired values in homogeneous or inhomogeneous image regions.
5. The calculation of the inspection sensitivity from the desired values and their respective tolerances.
6. The setting of the parameters of the image inspection system with the aid of the inspection sensitivity.
7. The configuration of the image inspection using the parameters.

The core element of the disclosed method is the division of the reference image into homogeneous and inhomogeneous image regions. The homogeneous regions are characterized by sparse occurrence of structures, color changes and edges. By contrast, the inhomogeneous regions include many strongly structured image areas, color changes and many edges. Different tolerances are selected in each case for the two regions. Thus, it is possible to select smaller tolerance values in the homogeneous regions, that is to say for the inspection to be more stringent than in the inhomogeneous edge regions. The different tolerance values are assigned to the respective desired values thereof in accordance therewith. Depending on whether the desired value is positioned in a homogeneous or inhomogeneous region, it is assigned a low or high tolerance value in accordance therewith. The pairs of data containing desired values and tolerance values can be used to calculate the inspection sensitivity with which the printed images to be tested are examined in the course of the image inspection. It is possible, in turn, to use the inspection sensitivity to derive the parameters with which the image inspection is automatically configured. It is an advantage of the method disclosed that the parameterization is carried out automatically for each new printing job, and that therefore there is no longer any need for the presence of an experienced user. A further advantage is, moreover, the direct adjustment of the image inspection method to the respective image content. It is thereby possible to adjust the test parameters to the image respectively to be inspected in an accurate and individual fashion.

Advantageous, and therefore preferred developments of the method follow from the associated sub claims and from the description with the associated drawings.

A preferred development in this case is that the tolerance values are set in relation to the brightness of the illumination in the image capture of the reference image. This can become necessary because when capturing the printed image with a digital camera the brightness of the illumination decreases owing to the aging of the light source in the course of time. Since this has a direct influence on the measured color values of the photographed image, it is necessary to adjust the tolerance thresholds.

A preferred development of the invention according to the invention is that the tolerance values are increased in image regions which have been impaired by the sheet run behavior. The sheet run behavior, that is to say the turning up of the trailing edge of the sheet, causes an unpredictable distortion of the image geometry. This can likewise be detected automatically and taken into account by an automatic adjustment of the parameters.

A further preferred development of the method according to the invention is that the paper quality is included in the statistical image analysis for determining the tolerance values. Although it is not decisive for the method disclosed, the paper quality is, nevertheless, a parameter which should be taken into account. The quality of the paper, influenced by the frequency of inclusions, for example, can have an influence on the statistical analysis of the image. The influence can be calculated by a comparison with a known, better paper, and then be included in the tolerance calculation emerging from the statistical image analysis.

A preferred development of the method according to the invention is that the user can set various sensitivity levels which vary the tolerance level for all or specific image regions as a function of the selected level. Starting from the known prior art, namely that the user can set various sensitivity levels for the image inspection, this method also is practical for automated parameterization. The difference is that various, fixed parameter sets are not selected here, but the tolerance values determined by the method are varied depending on the selection of the sensitivity levels with a corresponding offset value.

A preferred development of the method according to the invention is that the user can switch the automatic parameterization on and off, thereby enabling the manual input of the parameters. Although the automatic parameterization according to the disclosed method is the preferred operating mode, it is intended that the user be enabled as before to input the parameters manually and/or subsequently correct parameters determined by the automatic method.

A preferred development of the method according to the invention is that the user can subsequently correct the automatically determined parameters by hand. Such a subsequent correction can be necessary when the automatic method does not correctly detect or classify specific test criteria, or if the environmental parameters change during the operation of the printing machine.

A preferred development of the method according to the invention is that the automatically determined parameters are filed in a memory which can be accessed from the computer. It is not essential for an internal memory of the computer to be involved. An external network memory is also conceivable. The filing of the parameters determined facilitates the manual correction and the subsequent error analysis in the case of defective parameterization.

Other features which are considered as characteristic for the invention are set forth in the appended claims.

Although the invention is illustrated and described herein as embodied in a method for the automatic parameterization of the error detection of an image inspection system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. Mutually corresponding elements are provided in the drawings with the same reference numerals in each case.

DETAILED DESCRIPTION OF THE INVENTION

Figure 1:
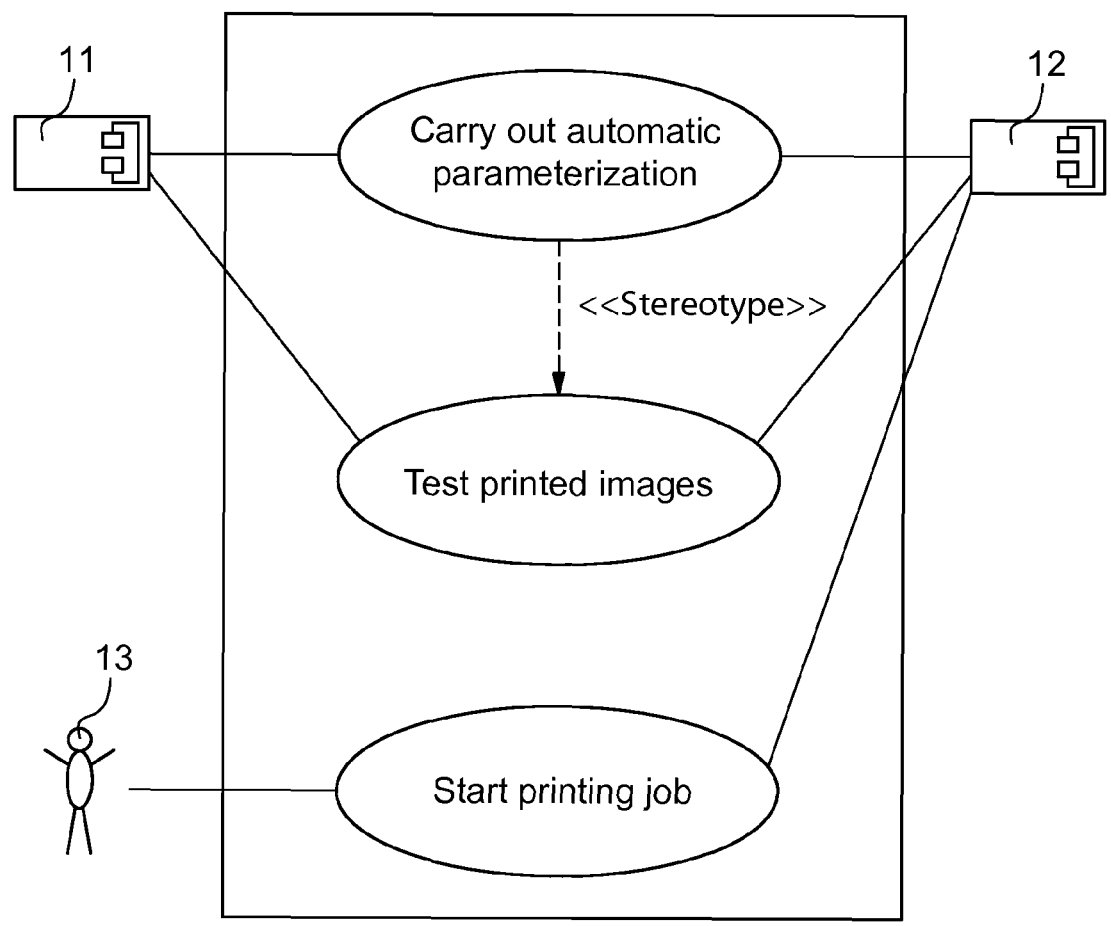
FIG. 1 is an illustration showing how a method is used according to the invention.
Figure 2:
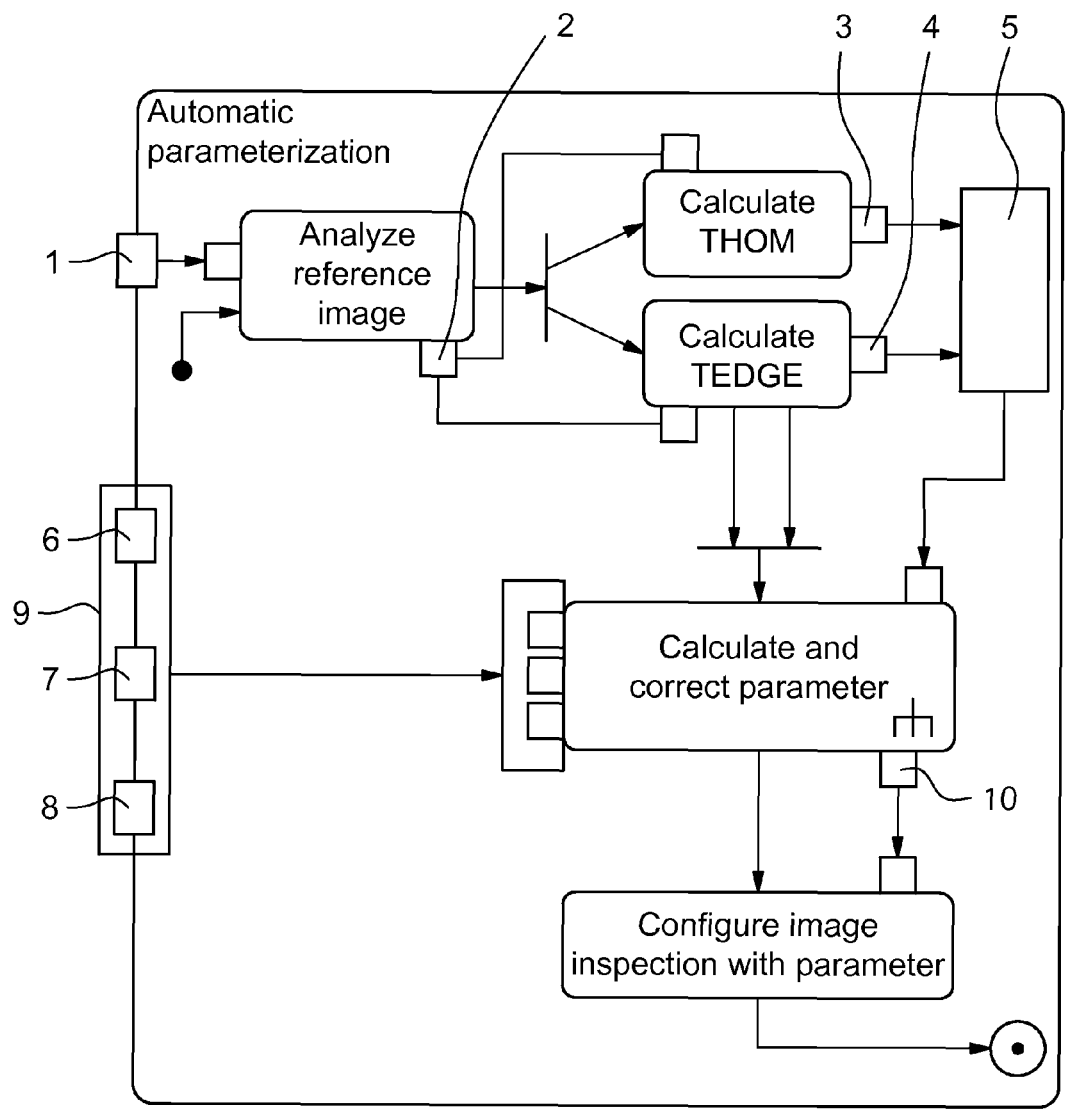
FIG. 2 is an illustration showing a sequence of the method.

Referring now to the figures of the drawings in detail and first, particularly to FIG. 1 thereof, there is shown a preferred exemplary embodiment. A user 13 can start a parameterization of an image inspection as a printing job is being carried out. The image inspection is carried out by a program which, as may be seen in FIG. 1, runs on a computer and includes a graphics user interface which the user 13 can operate via a display screen 12 connected to the computer. Via the display screen 12 and appropriate input and output devices, the user 13 can set whether he would like to carry out the parameterization manually, to use the automatic method or subsequently to correct the parameters of an already running method. The sequence of the automatic parameterization is illustrated in FIG. 2. If such is selected or started by the user 13, desired values 10 for the image inspection are obtained from a reference printed image 1. The point is that the basic measurement principle of the image inspection rests on the match between the desired values 10 of the reference image 1, including certain tolerances, and the measured actual values of the images to be tested. In order to determine the tolerances for the respective desired values 10, the reference image 1 is divided into homogeneous image regions and inhomogeneous image regions. The inhomogeneous image regions are distinguished in that they include strongly structured image areas with many color changes and edge regions. This is consequently not the case for the homogeneous image regions. Consequently, for them it is possible to select a small tolerance, which is to say the regions are examined more stringently by the image inspection method. The tolerance in the homogeneous image regions, called THOM 3 below, should, however, be at least so large that a fortuitously large change in intensity of a pixel of a homogeneous area does not exceed the tolerance values 3 and lead to a false positive error. Such an error report would declare to be defective an image area held to be good in the sense of its visual assessment by the user 13. The determination of the tolerance values 3 for the homogeneous regions is performed automatically via statistical analyses of the noise performance of the respective image area. The resulting tolerance THOM 3 must then be so large that the probability of the occurrence of a fortuitous change in intensity, which leads to false positive error reports, is smaller than probable according to the statistics. For example, if the statistical analysis determines a normal distribution of the color values and a standard deviation of stdabw, then THOM=6*stdabw would move the probability of a pseudo error for stdabw=two gray stages into the order of magnitude of a billionth. It follows that a pseudo error probably occurs for a billion statistically independent events, that is to say measurements of similar pixels. The tolerance values 4 for the inhomogeneous regions with many edges are calculated in the same way. The tolerance values 4, called TEDGE 4 below, are calculated using a similar method. What is decisive is the determination of the tolerance values 3, 4 by statistical image analyses.

The decision as to whether a desired value 10, that is to say pixel in the reference image, is assigned a tolerance type THOM 3 or TEDGE 4, which is synonymous with the assignment of the desired value 10 into the homogeneous or inhomogeneous image region, can be taken with the aid of edge filters with subsequent threshold operation. The method is taken from the prior art. The grading of the inspection sensitivity can now be performed such that the most sensitive level is placed at the limit to be calculated, 6*stdabw in the above named example, and the most insensitive level is placed an order of magnitude toward the safer side. The parameters for the image inspection can now be set with the aid of the inspection sensitivity determined, that is to say the desired values 10 and their respective tolerances 3, 4.

However, there are yet further parameters 9, independent of the image content, which influence the level of the tolerance values 3, 4. One of the parameters is the brightness of the illumination 7. This comes about owing to the fact that the light source which illuminates the image printed and captured by the digital camera ages in the course of time, which means that its brightness fades. The result is that the actual values of the captured image diverge, thus necessitating an increase in the tolerance thresholds. This is performed by determining the current brightness of the light source 7 and increasing the tolerance values 3, 4 as a function of the measured brightness value of the light source 7.

Another external parameter is the account which is taken of the so-called sheet run behavior 8. In this case, the turning up of the trailing edge of the sheet causes an unpredictable distortion of the image geometry. The point is that if the sheet lifts off the cylinder this gives rise to apparent changes in width of the image owing to the shortening of the object width, particularly at the visual limits of the camera 11. This can be automatically determined by an appropriate analysis of the digital image, and be compensated by increasing the tolerance values 3, 4 in the relevant sheet and/or image region. It is the tolerance values of type TEDGE 4 that are affected, since edge regions are involved.

In addition, the paper quality 6 should also be taken into account as parameter. The quality of the paper 6 can fluctuate, for example owing to the frequency of inclusions. By a statistical analysis, it is possible to calculate the influence of the paper quality 6 with the aid of a comparison with a known, better paper. Alternatively, it is also possible for the paper type to be preset by the user, together with the setting as to whether paper defects are to be investigated and included in the calculation of the tolerance values 3, 4, or ignored. The external parameters 9 should be taken into account, which entails adjustment of the tolerance values 3, 4 determined.

Figure 3:
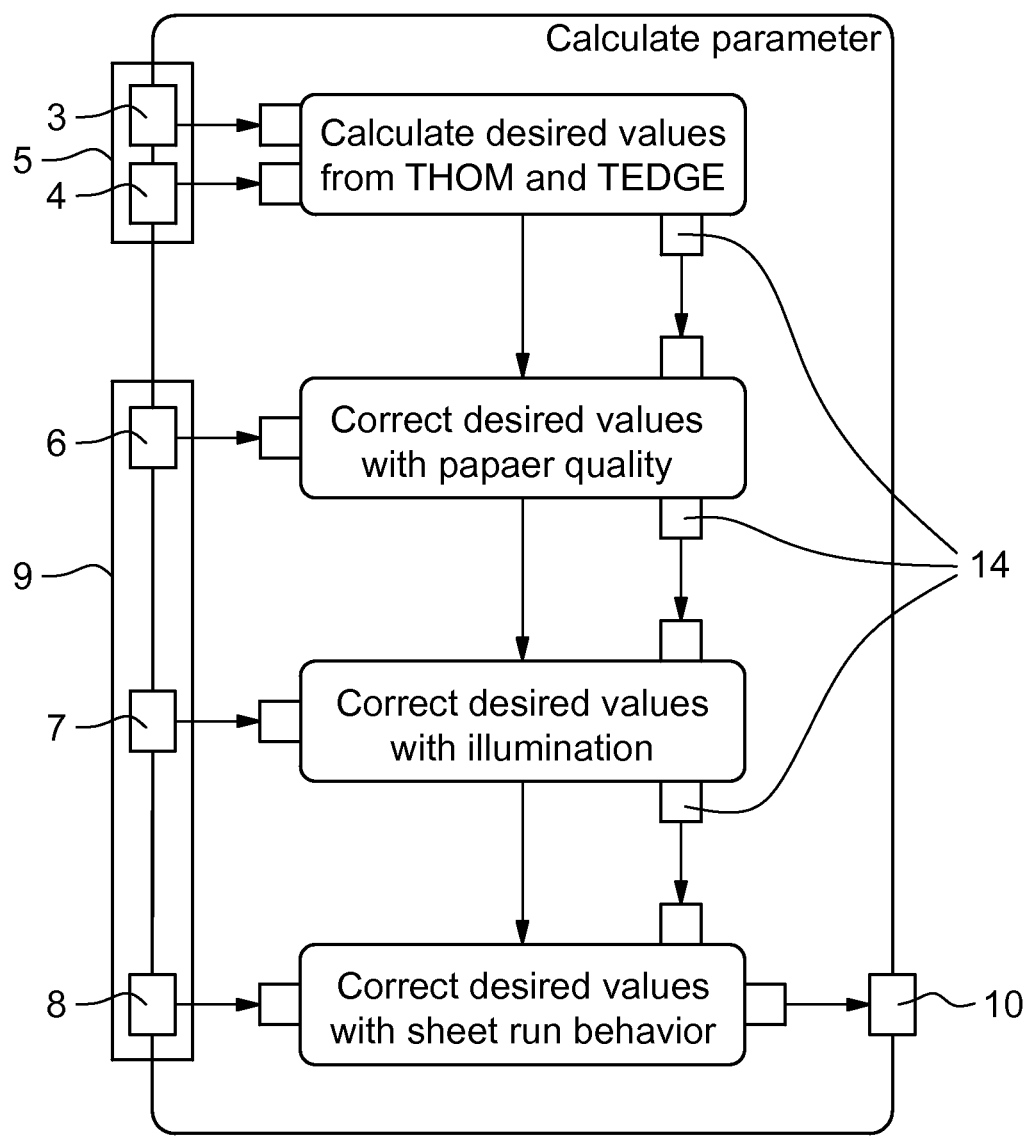
FIG. 3 is an illustration showing an automatic calculation and correction of the parameters.

The method presented above can be used to determine the requisite deviations of the tolerance values 3, 4 to take account of the parameters 9, and to carry out the subsequent correction following the calculation of the tolerances 3, 4, as described in FIG. 3. The inspection can be parameterized with the aid of the desired values 10 determined, their tolerances 3, 4 and the inspection sensitivity resulting therefrom. It is also sensible for the parameters determined to be temporarily or finally stored, in order if required to be able to access the values again, and/or to correct them subsequently during operation.

The following is a summary list of reference numerals and the corresponding structure used in the above description of the invention:
1. Reference printed image
2. Resulting image data
3. THOM values of the image
4. TEDGE values of the image
5. Buffer for THOM and TEDGE values
6. Paper quality
7. Illumination
8. Sheet run behavior
9. Further parameters
10. Final desired values
11. Camera for printed image digitization
12. Display screen
13. Printer (person)
14. Intermediate desired values

The invention claimed is:

1. A method for automatic parameterization of error detection of an image inspection system by a computer, which comprises the following steps of:
   digitizing a reference image for determining desired values;
   subdividing the reference image into homogeneous image regions with few edges, and inhomogeneous image regions with strongly structured image areas and many edges;
   determining tolerance values including lower tolerance values for the homogeneous image regions and higher tolerance values for the inhomogeneous image regions of the reference image by statistical image analyses, the lower tolerances values being lower than the higher tolerance values;
   assigning the tolerance values determined to the desired values in dependence on a position of the desired values in the homogeneous image regions or the inhomogeneous image regions;
   setting, via a user, various sensitivity levels which vary a tolerance level for all or specific image regions in dependence on a selected level;
   calculating an inspection sensitivity from the desired values and the tolerances values associated therewith; and
   setting parameters of the image inspection system with an aid of an inspection sensitivity configuration of the image inspection system using the parameters.

2. The method according to claim 1, which further comprises setting the tolerance values in relation to a brightness of an illumination in an image capture of the reference image.

3. The method according to claim 1, which further comprises increasing the tolerance values in image regions which have been impaired by sheet run behavior.

4. The method according to claim 1, which further comprises including paper quality in the statistical image analyses for determining the tolerance values.

5. The method according to claim 1, which further comprises switching, via the user, the automatic parameterization on and off, thereby enabling a manual input of the parameters.

6. The method according to claim 5, wherein the user can correct automatically the parameters determined by hand.

7. The method according to claim 1, which further comprises filing automatically the parameters determined in a storage medium accessible to the computer.

8. An image inspection system, comprising:
a computer for checking printed images of a printing machine, said computer programmed to perform a method according to claim 1.

* * * * *